Patented June 17, 1924.

1,497,672

UNITED STATES PATENT OFFICE.

WALTER H. DICKERSON, OF MUSKEGON, MICHIGAN, ASSIGNOR, BY MESNE ASSIGNMENTS, TO INDUSTRIAL WASTE PRODUCTS CORPORATION, A CORPORATION OF DELAWARE.

PROCESS OF TREATING WASTE SULPHITE LIQUOR AND COMPOUND OBTAINED THEREFROM.

No Drawing.   Application filed March 28, 1914. Serial No. 827,948.

*To all whom it may concern:*

Be it known that I, WALTER H. DICKERSON, a citizen of the United States, and resident of Muskegon, in the county of Muskegon and State of Michigan, have invented certain new and useful Processes of Treating Waste Sulphite Liquor and Compound Obtained Therefrom, of which the following is a specification.

My invention relates to compositions of matter and the method of making the same; and it comprises a composition containing altered organic matters of waste sulphite liquor, and the process of preparing the same.

My improved process comprises the treatment of waste sulphite liquor, either in its raw or treated state.

I have discovered that by treating waste sulphite liquors, or products obtained therefrom, with suitable hydrogen compounds to produce altered organic constituents of the waste sulphite liquors, I can produce new compounds of great utility in the arts, such compounds being susceptible for such uses for example as tanning extracts, adhesive compounds or binders having highly desirable characteristics.

In the practical application of my invention I use as the raw material, waste sulphite liquor, preferably soon after it is received from the digestors in the manufacture of paper pulp by the sulphite process. However, instead of such raw, waste sulphite liquor, which is acid, I may use neutralized, alkaline or other treated liquors. But I prefer to use unaltered, acid, waste sulphite liquors as the raw material. In treating such raw materials to produce my improved product, in practical operation I employ preferably sulphuretted hydrogen gas.

In using waste sulphite liquor as it comes from the digestors, it is first cooled down, preferably by blowing into a vacuum, thus ridding the liquor of as much free sulphur dioxide as possible. Of course, this treatment with sulphuretted hydrogen gas may be effected after the liquors have been concentrated somewhat if desired.

The treatment is effected by blowing the gas through the liquor, or in any other suitable manner customary in such treatments, and should be continued for eight to ten hours, or until the liquor shows a heavy precipitation of sulphur which does not further increase. It will be observed, soon after treatment is started, that the liquor becomes cloudy, which is due to the precipitation of sulphur in the solid form. This sulphur, analyses indicate, is derived both from the sulphuretted hydrogen and the sulphite compounds of the waste sulphite liquor. This precipitated sulphur should be eventually removed by filtration or by decantation after settling.

Sulfuretted hydrogen is a well known and powerful reducing agent and among the many possible reactions which occur between it and the organic components of the sulphite waste liquor, a reducing effect is evidently prominent.

Subsequent to such treatment of the waste sulphite liquor I find it preferable to add thereto reagents such as oxalic acid, ammonium sulfate, aluminum sulfate, or other sulfates which will precipitate the lime from the liquor and liberate tanning agents for example. I may also add lactic acid or acetic acid or other organic acids which do not precipitate lime but which seem to increase the tanning effect of the resulting product. In some cases I may even add very dilute inorganic acids such as sulphuric acid to precipitate the lime.

When the finished product is to be used for bleaching purposes, for which it is very suitable, I find that it is well to add bisulfate of soda, which increases its bleaching properties. When any precipitate of calcium oxalate or calcium sulfate, etc., resulting from these or similar treatments, has settled, the resulting liquor may be decanted and may then be concentrated to any desired degree suitable for the purpose, or even to dryness.

I prefer to carry out my previously described treatment of the liquor before it has been so treated for the removal of calcium or before it has been concentrated, but the order of these steps may be reversed or otherwise changed if it is desired. Thus the liquors may first be concentrated after they come from the digestors, then freed from calcium by addition of oxalic acid, and then finally treated with sulphuretted hydrogen.

If the liquors are concentrated before this treatment it will be found necessary to use a filter press to free the finished product from the precipitated calcium salts or sulphur, or both.

Treatment of waste sulphite liquors as hereinbefore described produces a novel product which has improved and valuable properties when used, for tanning extracts, for example. In the first place, it gives an increased, available tanning content to the tanning extract, as compared with that obtained ordinarily from waste sulphite liquors, and as is shown by the hide powder method of analysis. The hide powder method of analysis gives a perfectly clear and water-white, non-tan filtrate, something which I believe it has never been possible to hitherto obtain with any sulphite liquor tanning extract. Moreover, leather tanned by extracts prepared as described herein, dries out much softer and without the hard and tinny feeling characteristic of leather tanned in waste sulphite liquor extracts hitherto produced. My tanning extracts have a lower sulphur content and are much more fluid in character than extracts prepared otherwise.

Another and very important characteristic of my new tanning extract is that when oxalic acid or ammonium sulfate have been used in its preparation, it then has the power of completely dissolving all of the "reds" or insolubles of quebracho or other similar tanning extracts. To effect this advantageous solution of such insolubles I mix my tanning extract which has been treated with oxalic acid or ammonium sulfate with ordinary quebracho extract, preferably at a temperature of say 140 to 150° F. and for example, in the proportion of 35 to 50 per cent, when an extract results which is completely and permanently soluble in cold water. Ordinary quebracho extract, alone, contains as high as 6 or 7 per cent of "reds" or insolubles.

On the other hand when aluminum sulfate or sodium sulfate are used in preparing my new tanning extract the mixture of this extract with ordinary quebracho extract is not soluble in cold water, but will generally increase the proportion of reds or insolubles above that ordinarily contained in such extracts as quebracho, for example. This property of reacting upon other tanning extracts in this manner is developed to a much higher degree in my extract than in extracts prepared by any other process from waste sulphite liquors. The advantage of these characteristics of my improved waste sulphite liquor will be readily appreciated by those skilled in the art.

I claim—

1. The process of treating waste sulphite liquor which includes treating it with sulphuretted hydrogen.

2. The process of preparing tanning extracts from waste sulphite liquor which includes cooling the raw liquor and treating it with sulphuretted hydrogen.

3. The process of preparing tanning extracts from waste sulphite liquor which includes cooling the raw liquor to about 100° F., treating it with sulphuretted hydrogen gas, and adding a suitable acid-reacting reagent.

4. The process of preparing tanning extracts from waste sulphite liquor which includes treating it with sulphuretted hydrogen, adding oxalic acid and concentrating to a suitable degree.

5. As a new composition of matter, a composition containing the organic constituents of waste sulphite liquor and giving a colorless, non-cloudy, non-tan filtrate when treated with hide powder.

6. As a new composition of matter, a composition containing the organic constituents of waste sulphite liquor of reduced sulfur content.

7. As a new composition of matter, a solution containing the organic constituents of waste sulphite liquor, which is capable of completely dissolving the insolubles of quebracho tanning extracts when mixed therewith in substantially equal proportions, and which gives a colorless, non-cloudy, non-tan filtrate when treated with hide powder.

8. As a new material sulphite liquor having its organic constituents reduced.

Signed at New York in the county of New York and State of New York this 24th day of March, A. D. 1914.

WALTER H. DICKERSON.

Witnesses:
  FRED'K F. SCHUETZ,
  ARTHUR WORISCHEK.